No. 652,437. Patented June 26, 1900.
J. MATTHIAS.
THERMO ELECTRIC BATTERY OR PILE.
(Application filed June 19, 1899.)
(No Model.)
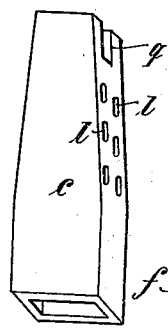
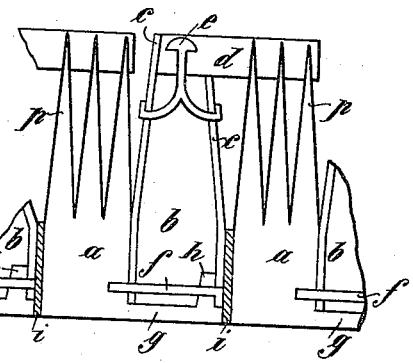
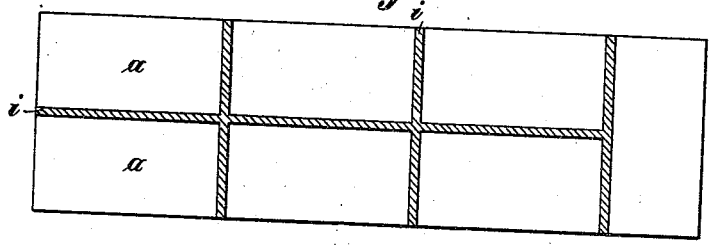
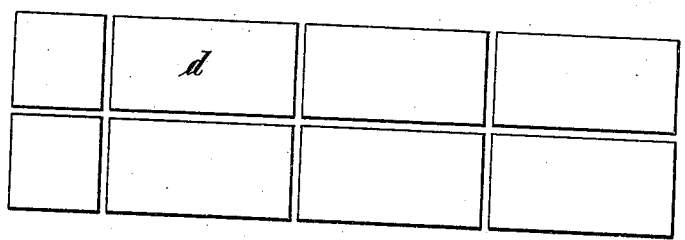

UNITED STATES PATENT OFFICE.

JOSEPH MATTHIAS, OF STUTTGART, GERMANY.

THERMO-ELECTRIC BATTERY OR PILE.

SPECIFICATION forming part of Letters Patent No. 652,437, dated June 26, 1900.

Application filed June 19, 1899. Serial No. 721,126. (No model.)

*To all whom it may concern:*

Be it known that I, JOSEPH MATTHIAS, telegraph secretary, residing at 55 Gymnasiumsstrasse, Stuttgart, in the German Empire, have invented certain new and useful Improvements in Thermo-Electrical Batteries or Piles, of which the following is a specification.

In thermo-electric batteries or piles every element or cell is composed, as is well known, of two different metals or metallic alloys. If these are chosen so that they are able to produce the greatest possible electrical action, they being therefore as widely separated as possible in the electric tensile series, the physical properties of the metals or metallic alloys will then differ relatively more from one another than in the case where only a slight action is produced and the metals in question are situated nearer together in the electrical tensile series. If, for instance, there is taken for the composition of the electrodes on one side German silver and on the other side an alloy composed of two parts of antimony and one part of zinc, a greater electrical action is obtained; but the fact has to be considered that while the first electrode is hard the second has the disadvantage of greater fragility. This extreme fragility or liability to fracture has hitherto hindered the general application of such alloys to thermo-electrical purposes, however much it may have been desired to make use of their high electromotive power. If, besides this, (as in the case of the electrodes described in the following description,) their special form is such as to increase their liability to be broken, their application would be absolutely impossible unless special protective means are employed.

The present invention consists of an improvement in thermo-electrical batteries or piles by which great firmness or support is imparted to the fragile electrode, thereby permitting an unlimited application and durability of the elements and at the same time reducing the resistance to a minimum by reason of the special form, arrangement, and connection of the electrodes uniting the separate elements in very large numbers in a relatively-small space and permitting an intense cooling action being applied to the side of the electrode farthest from the source of heat.

In the accompanying drawings, Figure 1 is a vertical section through a part of the battery; Fig. 2, a perspective view of the protecting-cover; Fig. 3, a view of the battery from below, and Fig. 4 a view of the battery from above.

The separate electrodes have in their outer configuration the form of prisms and are placed side by side. The two electrodes of an element differ, however, in form from one another in so far that the electrode $a$, composed of hard metal, has a projection $g$ on the side which is to be turned toward the source of heat, the size of which projection exactly corresponds with the bottom surface of the electrode $b$, composed of fragile metal. The sides of the electrodes $a$ which are turned to the source of heat are preferably arranged so that their surfaces will be of such a size as to completely fill up that side of the battery. By this means the elements on that side which is turned toward the source of heat offer no spaces by which the hot air might pass to the other side. In the drawings the form of a rectangle is shown as an example the length of which is twice as long as the width, while the electrode $a$ above the projection $g$ is square in cross-section, as is also the lower part of the electrode $b$. This lower part of each of the electrodes (disregarding the projection $g$) has approximately the form of a cube. The upper part of the electrode $a$ is formed into a large number—say 9—of tapering points $p$.

In order to give increased protection to the sides of the fragile electrode which is not formed into tapering points, the metal thereof is surrounded with a prismatic or other suitably-shaped clay or earthenware cover $c$, open at its top and bottom, which latter may rest on the projection $g$ of the hard electrode, which is provided with a spur $h$ for the reception of a connecting-pin $f$, which passes through it and the clay cover into the electrode $a$. The projection $g$, as well as the pin $f$, is covered with the thinnest possible layer of solder, and the metal for the electrode $b$ may be introduced in a molten condition into the clay cover and in this way becomes closely united by means of the solder both with the projection $g$ and with the pin $f$. In this case the clay or earthenware cover $c$ is not filled up to its top edge with the metal of the electrode $b$, but only to the edge of the opening $q$, situated toward the side of the adjoining element. This opening $q$ serves to receive the connecting bridge-piece $d$, which also is formed by casting and which connects the electrodes of the adjoining elements. This piece $d$ is made of good conducting metal difficult to melt. In casting the same the pointed ends of both electrodes are covered for about ten millimeters with the thinnest possible layer of solder, the connection with the electrode $b$ being made in casting the electrode $b$ and the bridge-piece $d$, the connecting-pin $e$ (also previously covered with the thinnest possible layer of solder) being surrounded by the molten metal. This pin holds with its head and neck in the bridge-piece, its lower portion, which extends into the alloy, being forked, as shown, so that its four branches pass through the walls of the clay or earthenware cover $c$ and are bent over upward or downward outside thereof and no undue strain is put upon the fragile mass of metal. The bridge $d$ is thus held by means of the four branches to the walls of the cover $c$, and a firm and close connection is created. The electrode $b$ is further provided with a number of air-holes $l$, which pass through its upper part parallel with the pin $f$. In making the electrode the holes in the walls are formed by the employment of cores, which are afterward removed. The object of forming the electrodes $a$ into tapering points and of providing the electrodes $b$ with air-holes is to enable the electrodes to be subjected in close contact as much as possible to the circulation of cool air, whereby the difference of temperature between the electrodes is increased. By forming the electrodes into tapering points the resistance of each separate element may also be reduced, as desired.

Having now particularly described and ascertained the nature of the said invention and in what manner the same is to be performed, I declare that what I claim is—

In thermo-electric batteries or piles the combination of a clay cover around an electric center piece both with coinciding side holes, with a metallic bridge-piece conducting to the next element and fastened to the clay cover by a pin situated with its head-shaped end inside the bridge-piece and passing with its forked branches through the center piece and the clay cover on the outside of which the branches rest with their ends bent over.

In witness whereof I have hereunto set my hand in presence of two witnesses.

JOSEPH MATTHIAS.

Witnesses:
A. BAUER,
HERMAN WAGNER.